United States Patent [19]

Takahashi et al.

[11] Patent Number: 5,201,225
[45] Date of Patent: Apr. 13, 1993

[54] INSTRUMENT FOR MEASURING THICKNESS OF COATED PLATE AND METHOD THEREOF

[75] Inventors: Osamu Takahashi, Tokyo; Masaaki Nakata, Yokohama, both of Japan

[73] Assignee: Toyo Kanetsu K.K., Tokyo, Japan

[21] Appl. No.: 586,889

[22] Filed: Sep. 24, 1990

[51] Int. Cl.⁵ .................................. G01N 29/18
[52] U.S. Cl. ............................. 73/615; 73/901
[58] Field of Search ............... 73/597, 615, 610, 612, 73/627, 901

[56] References Cited

U.S. PATENT DOCUMENTS 3,486,368 12/1969 Brech .................................. 73/615
4,918,989 4/1990 Desruelles et al. ................. 73/627
4,991,440 2/1991 Pleinis et al. ....................... 73/615

Primary Examiner—John E. Chapman
Attorney, Agent, or Firm—Brooks Haidt Haffner & Delahunty

[57] ABSTRACT

One oscillator of a dual type ultrasonic probe generates an ultrasonic pulse and receives a surface reflection wave and a boundary face reflection wave from a coated plate. Another oscillator receives a bottom reflection wave from the coated plate. As a result, these reflection waves can be received at high levels, and reception times of the boundary face reflection wave and the bottom reflection wave can be accurately discriminated. Therefore, the thickness of the plate alone can be accurately calculated from the difference in reception times.

3 Claims, 6 Drawing Sheets ns of a plate by measuring the time difference between the reflected wave (a first bottom reflection wave signal $B_1$) reflected from the bottom of a plate 28 and a bottom reflection wave (a second bottom reflection wave signal $B_2$) in which part of the first bottom reflection wave is not transmitted through the boundary face between the coating 26 and the plate 28 but is reflected and then reflected again from the bottom of the plate 28.

However, as shown in FIG. 3 in the $B_1$-$B_2$ method, if a corroded portion 30 exists on the bottom of the coated plate 12, signal $f_1$ from the reflected wave of the corroded portion 30, a signal $f_2$ of another reflected wave by the reflected wave and a signal $B_1$ of the bottom reflection wave are mixed in the signal output from the receiving element 18 of the probe 10, these signals cannot be clearly identified, and it is sometimes impossible to accurately measure the thickness of the plate 28.

INSTRUMENT FOR MEASURING THICKNESS OF COATED PLATE AND METHOD THEREOF

FIELD OF THE INVENTION

This invention relates to a measurement of the thickness of a coated plate and, more particularly, to an instrument for measuring the thickness of a plate from above a coating and a method thereof.

BACKGROUND OF THE INVENTION

When the thickness of a coated plate is measured, a suitable thickness measuring instrument is generally employed to measure the thickness after the coating is stripped off. However, since the work of removing the coating and repainting takes a great deal of labor, means for measuring the thickness of the plate with the coating intact have been heretofore studied.

FIG. 1 shows an example of such a conventional thickness measuring means, which measures the thickness of a plate by utilizing the reflection of an ultrasonic pulse. This thickness measuring means has an ultrasonic probe 10 used in close contact with a coated plate 12, and a thickness measuring unit 14 for measuring the thickness of the plate 12 according to a signal from the ultrasonic probe 10. The ultrasonic probe 10 is a so-called "dual type", and has an ultrasonic pulse transmitting element 16 and an ultrasonic pulse receiving element 18 aligned next to each other in a cylindrical case 20. An acoustic partition plate 22 extends between the transmitting element 16 and the receiving element 18 to the opening face of the case 20 so that an ultrasonic pulse from the transmitting element 16 does not propagate directly to the receiving element 18. A delaying material 24 is filled in the case 20. This ultrasonic probe 10 is used in close contact at the end face thereof with the surface of the coated plate 12. When an ultrasonic pulse is generated from the transmitting element 16, the pulse is reflected at the boundary face between a coating 26 and a plate 28 and the bottom of the plate 28, reflected waves are received by the receiving element 18, and its received signal is sent to the thickness measuring unit 14. The thickness measuring unit 14 calculates the thickness of the plate in accordance with the difference in reception times between the reflected wave from the boundary face and the reflected wave from the bottom of the plate.

However, since the acoustic partition plate 22 of the ultrasonic probe 10 of this means contacts with the surface of the coated plate 12, there arises a problem that the reception level of the reflected wave from the boundary face is low and measurement errors can easily occur. More specifically, in order to produce a signal by the reflected wave from the boundary face, it is necessary to greatly amplify the signal, and signal errors arising from the amplification cannot always be ignored. Simultaneously, noise which causes measurement errors (including various waves reflected within the coating 26 in the reflected wave from the boundary face, waves reflected from the top surface, etc.) is easily picked up. Therefore, particularly when the coating is thin, it is difficult to select and positively produce a signal from the reflected wave from the boundary face, and it is also difficult to accurately obtain the true thickness of the plate 28.

As another means, there is known a so-called $B_1$-$B_2$ method utilizing multiple bottom reflection waves. As shown in FIG. 2, this $B_1$-$B_2$ method obtains the thick-

SUMMARY OF THE INVENTION

Accordingly, a primary object of this invention is to provide an instrument for measuring the true thickness of a plate without removing a coating and a method thereof.

Another object of this invention is to provide a thickness measuring instrument for reliably producing a signal of a boundary face reflection wave and a signal of a bottom reflection wave and a method thereof.

According to one aspect of this invention, there is provided an instrument for measuring the thickness of a coated plate without including the thickness of the coating, the instrument having a dual type ultrasonic probe including a first element capable of transmitting and receiving an ultrasonic pulse, a second element capable of receiving at least an ultrasonic pulse, aligned in mutual proximity and spaced by an acoustic partition plate comprising (a) ultrasonic pulse generating means connected to the first element of the ultrasonic probe for generating an ultrasonic pulse from the first element, (b) first signal output means connected to the first element of the ultrasonic probe for outputting a signal corresponding to a boundary face reflection wave when the first element receives a surface reflection wave from an outer surface of the coating of the coated plate and a boundary face reflection wave from the boundary face between the coating and the plate, (c) second signal output means connected to the second element of the ultrasonic probe for outputting a signal corresponding to a bottom reflection wave when the second element receives the bottom reflection wave from the bottom of the plate, (d) signal processing means for obtaining the difference in reception times between the boundary face reflection wave and the bottom reflection wave according to the signals output from the first and second signal output means to calculate the thickness of the plate from the difference, and (e) display means for displaying the thickness of the plate calculated by the signal processing means.

According to another aspect of this invention, there is provided a method of measuring the thickness of a coated plate so as not to include the thickness of the coating comprising the steps of (a) disposing on an outer surface of the coating of the coated plate, a dual type ultrasonic probe having a first element capable of transmitting and receiving an ultrasonic pulse, a second element capable of receiving at least an ultrasonic pulse, aligned in mutual proximity and spaced by an acoustic partition plate, (b) generating an ultrasonic pulse from the first element of the ultrasonic probe, (c) outputting a signal corresponding to a boundary face reflection wave when the first element of the ultrasonic probe receives the surface reflection wave from the outer surface of the coating and a boundary face reflection wave from the boundary face between the coating and the plate, (d) outputting a signal corresponding to a bottom reflection wave when the second element of the ultrasonic probe receives the bottom reflection wave from the bottom of the plate, (e) determining the difference in reception times between the boundary face reflection wave and the bottom reflection wave in accordance with the two output signals, and (f) calculating the thickness of the plate from the time difference.

Since the boundary face reflection wave can be received by the first element of the dual type ultrasonic probe, the reception level of the boundary face reflection wave is large, and its signal can be accurately output. Therefore, the true thickness of the plate without including that of the coating can be accurately measured from the boundary face reflection wave and the bottom reflection wave.

These and other objects and features of the present invention will become apparent from the following detailed description in conjunction with the attached drawings.

BRIEF DESCRIPTION OF THE DRAWINGS

In the course of the following detailed description, reference will be made to the attached drawings in which.

DETAILED DESCRIPTION OF THE PREFERRED EMBODIMENT

Figure 1:
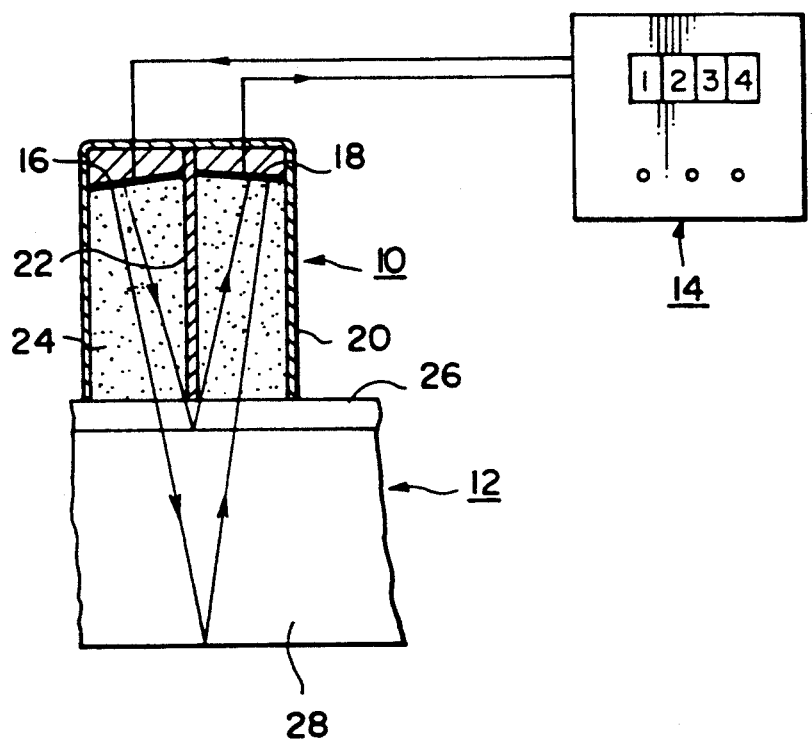
FIG. 1 is a schematic view showing a conventional thickness measuring means.
Figure 2:
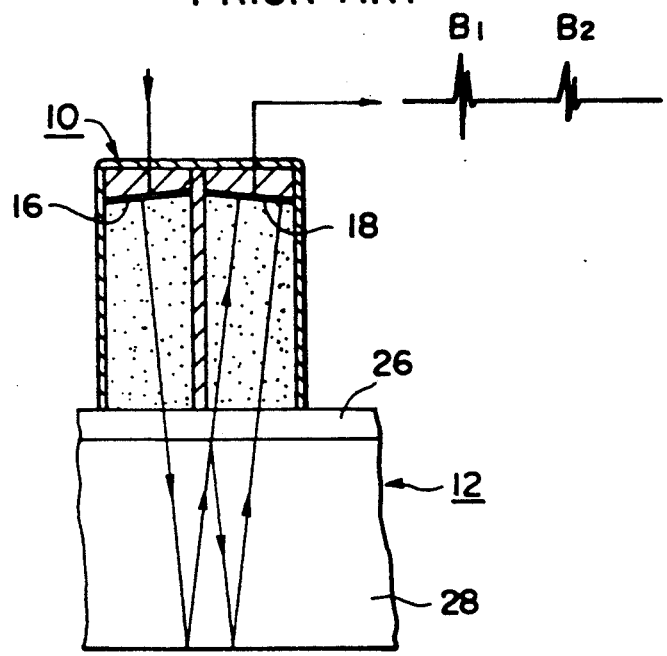
FIGS. 2 and 3 are schematic views showing thickness measuring means according to a $B_1$-$B_2$ method.
Figure 3:
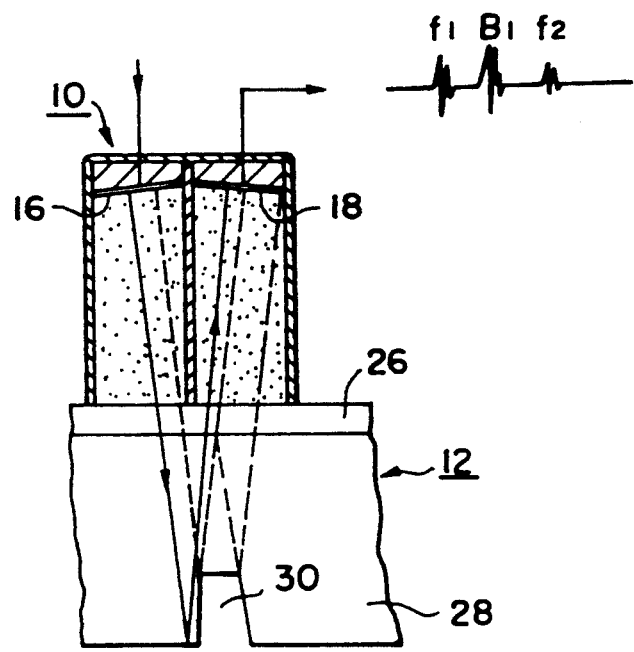

In the following description, like reference characters designate like or corresponding parts throughout the drawings.

Figure 4:
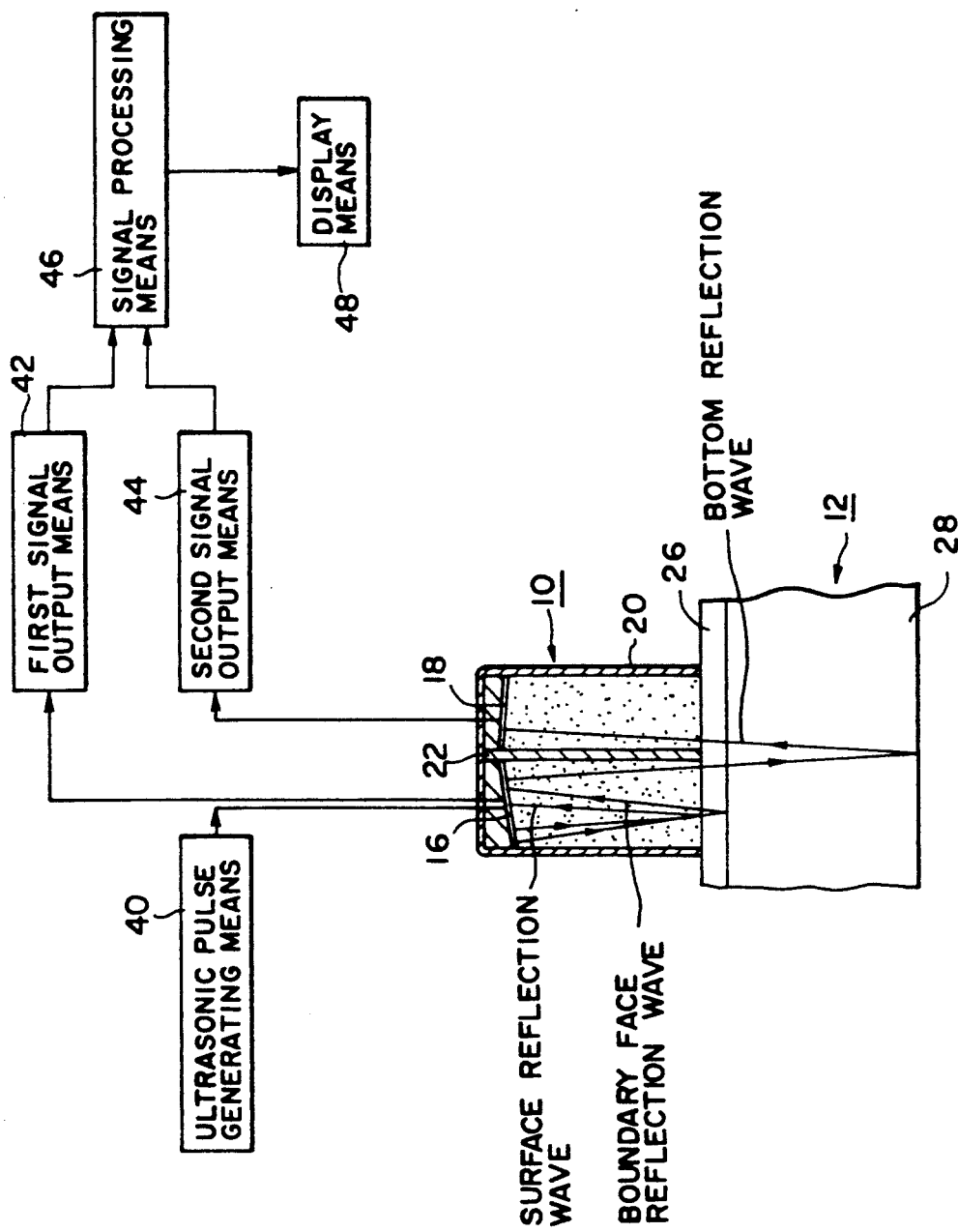
FIG. 4 is a schematic view showing a principle of this invention.

FIG. 4 is a schematic view showing a principle of this invention. Reference numeral 10 denotes a conventional dual type ultrasonic probe, which comprises an ultrasonic pulse transmitting element 16 and an ultrasonic pulse receiving element 18 aligned next to each other in a case 20, and an acoustic partition plate 22 disposed between both. These elements 16 and 18 are normally termed as "oscillators", having both transmitting and receiving functions. In this invention, the transmitting element 16 is constructed to transmit and receive an ultrasonic pulse. In the following description, the transmitting element 16 will be termed "first oscillator", and the receiving element 18 called "second oscillator".

The first oscillator 16 generates ultrasonic pulses at a predetermined period from ultrasonic pulse generating means 40. Part of the ultrasonic pulses is reflected from the outer surface of a coating 26 of a coated plate 12, and received by the first oscillator 16. Another part of the ultrasonic pulses passes through the coating 26, is reflected from the boundary face between the coating 26 and the plate 28, and is also received by the first oscillator 16. A signal corresponding to the boundary face reflection wave is then output from first signal output means 42.

The remaining ultrasonic pulses are propagated through the plate 28, reflected from the bottom of the plate 28, and received by the second oscillator 18. A signal corresponding to the bottom reflection wave is output from second signal output means 44.

The signals corresponding to the boundary face refection wave and the bottom reflection wave are input to signal processing means 46, which obtains the times when the reflected waves are received by the oscillators 16 and 18, and calculates the thickness of plate 28 alone from the time difference. The calculated thickness is displayed by suitable display means 48.

Figure 5:
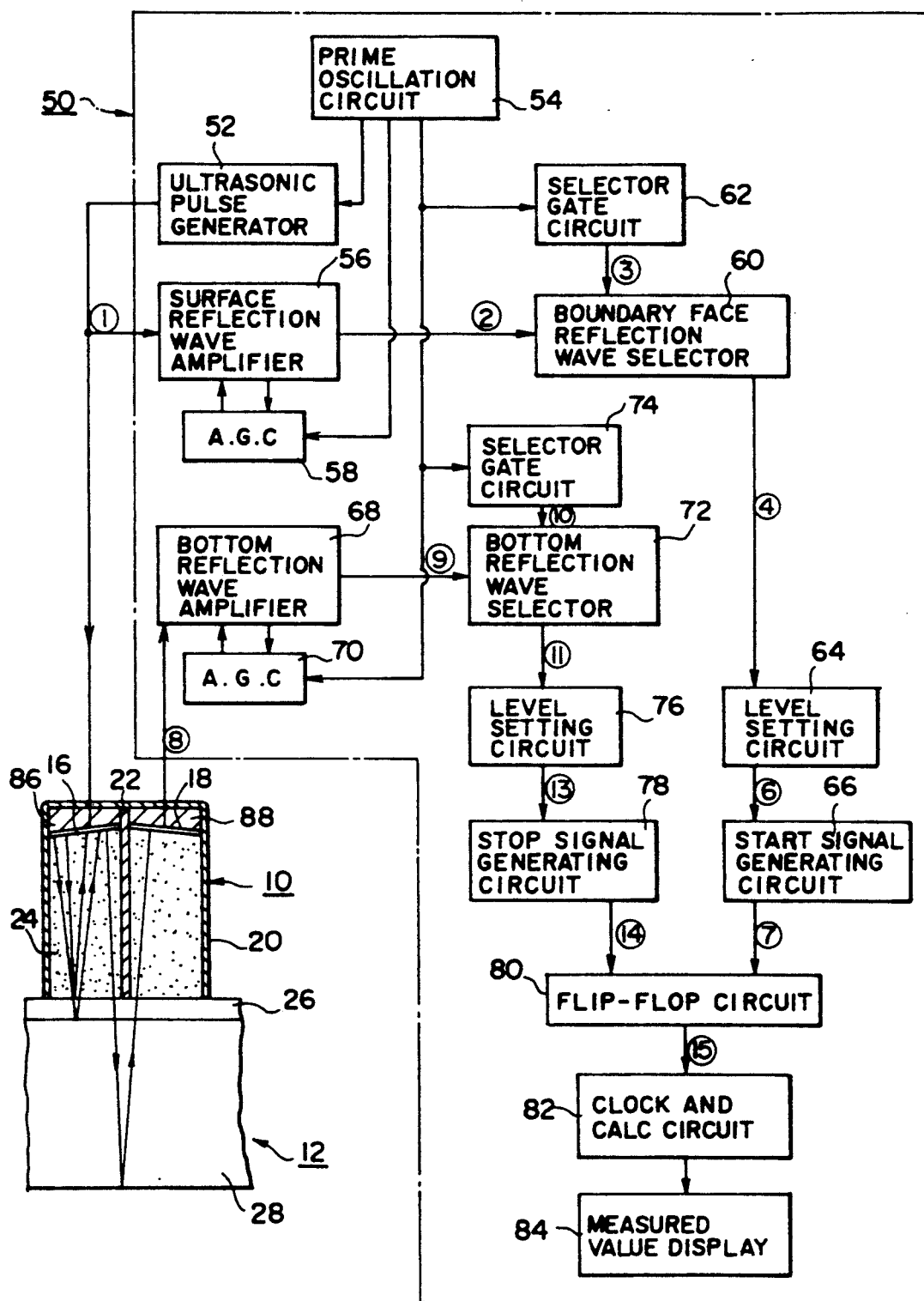
FIG. 5 is a schematic view showing a thickness measuring instrument and an ultrasonic probe according to this invention.

FIG. 5 shows a preferred embodiment of a thickness measuring instrument exemplified according to the principle of this invention. This thickness measuring instrument 50 is connected to an ultrasonic probe 10 for use.

When the thickness of only the plate 28 of the coated plate 12 is measured, the surface of the coating 26 is first coated with a contact medium such as glycerin, etc., and the open face of the ultrasonic probe 10 is closely contacted thereto. This is carried out to eliminate the generation of large surface reflection waves.

The first oscillator 16 of the ultrasonic probe 10 is connected to the ultrasonic pulse generator 52 of the thickness measuring instrument 50. This ultrasonic pulse generator 52 generates an ultrasonic pulse generation signal upon reception of a rectangular pulse of a predetermined period from a prime oscillation circuit 54, and generates ultrasonic pulses at the predetermined period from the first oscillator 16.

A part of the ultrasonic pulses generated from the first oscillator 16 is first reflected on the surface of the coating 26. Since this surface reflection wave is shielded by the acoustic partition plate 22, the surface reflection wave is not substantially propagated to the second oscillator 18, but mainly received by the first oscillator 16. The part of the ultrasonic pulses that passes through the coating 26 is reflected from the boundary face between the coating 26 and the plate 28, most of the boundary face reflection wave being received by the first oscillator 16 similarly to the surface reflection wave. A signal ① from the first oscillator 16 which received the surface reflection wave and the boundary face reflection wave is sent to the surface reflection wave amplifier 56 of the thickness measuring instrument 50. Here, reference numerals ① to 15 shown in FIG. 5 respectively correspond to the waveforms ① to 15 of the signals shown in FIG. 6, with reference to FIGS. 5 and 6.

Figure 6:
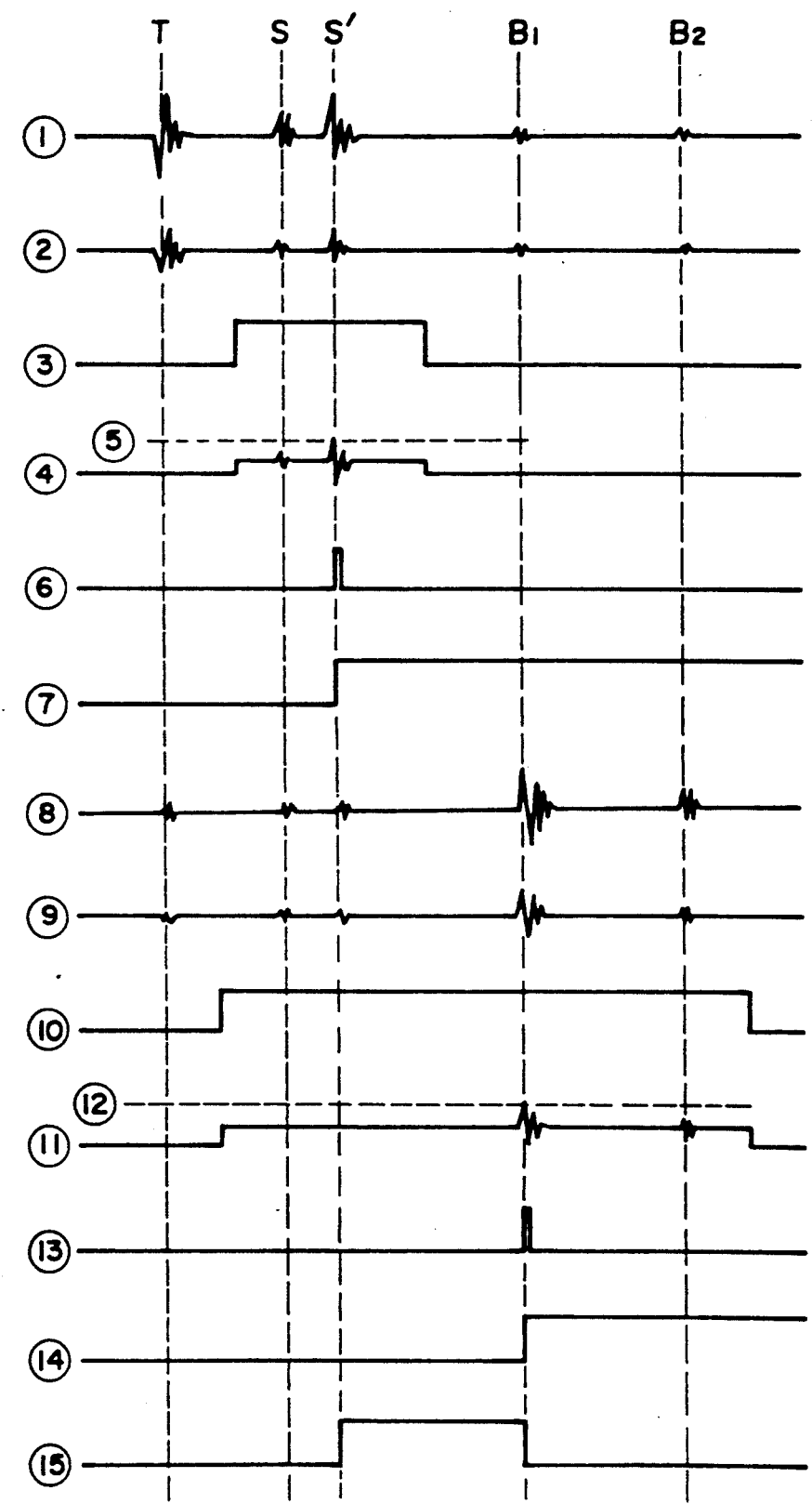
FIG. 6 is a diagram showing waveforms of signals transmitted through the lines of FIG. 5.

An automatic gain control voltage (which is a predetermined negative voltage in this embodiment) is applied to the signal ① by an automatic gain controller (A.G.C.) 58 in the surface reflection wave amplifier 56, and the signal ① is regulated to a suitable level as shown by the waveform ② of FIG. 6. Then, the regulated signal is input to a boundary face reflection wave selector 60. The boundary face reflection wave selector 60 receives a preset gate signal ③ of the waveform ③ of FIG. 6 in response to the thickness of the coating 26 from a selector gate circuit 62, and outputs a signal ④ responsive to the surface reflection wave and the boundary face reflection wave. Only a signal exceeding a level set value (⑤ in FIG. 6), i.e., a signal ⑥ corresponding to the boundary face reflection wave is output from a level setting circuit 64, and a clock start signal ⑦ for measuring the thickness of the plate in accordance with the signal ⑥ is formed in a start signal generating circuit 66.

The remaining ultrasonic pulses generated from the first oscillator 16 are propagated through the coating 26 and the plate 28, reflected from the bottom of the plate 28, and the bottom reflection wave is received by the second oscillator 18. This reception signal ⑧ is passed through the bottom reflection wave amplifier 68 of the thickness measuring instrument 50, regulated by an automatic gain controller (A.G.C.) 70, and the regulated signal ⑨ is input to a bottom reflection wave selector 72. Then, the signal ⑨ is converted to a signal 11 by a gate signal 10 from a selector gate circuit 74 in the bottom reflection wave selector 72, and a signal 13 corresponding to the bottom reflection wave is output in accordance with the level set value (12 of FIG. 6) by a level setting circuit 76. Thereafter, the signal 13 is output as a clock stop signal 14 from a stop signal generating circuit 78.

The clock start signal ⑦ and the clock stop signal 14 are input to a flip-flop circuit 80, which, in turn, outputs a signal 15 corresponding to a time from the reception time of the boundary face reflection wave to the reception time of the bottom reflection wave as understood from the waveform 15 of FIG. 6. This is counted by a clock and calculating circuit 82, which calculates in accordance with the propagating speed of the ultrasonic wave in the plate 28 thereby to calculate the true thickness (the thickness not including the coating) of the plate 28, and to display the value on a measured value display 84 such as a liquid crystal display or a CRT, etc. The calculated result may also be displayed by a printer.

Also, this thickness measuring instrument 50 can measure the thickness of an uncoated plate. In this case, a signal corresponding to a surface reflection wave ca be output from the boundary face reflection wave selector 60 and used as a clock start signal. This is achieved by adjusting the level of the gate signal ③ from the selector gate circuit 62. As a surface reflection wave from the surface of the uncoated plate is higher than a surface reflection wave from the coating 26 due to the large difference in acoustic impedances between the delay material 24 in the casing 20 of the probe 10 and the uncoated plate, this adjustment of the gate signal level is easily performed.

It should be noted that as the thickness measuring technique according to the present invention utilizes the bottom reflection wave, as well as the boundary face reflection wave or the surface reflection wave, the thickness of the plate can be accurately calculated in spite of kinds of the delay materials 24.

Figure 7:
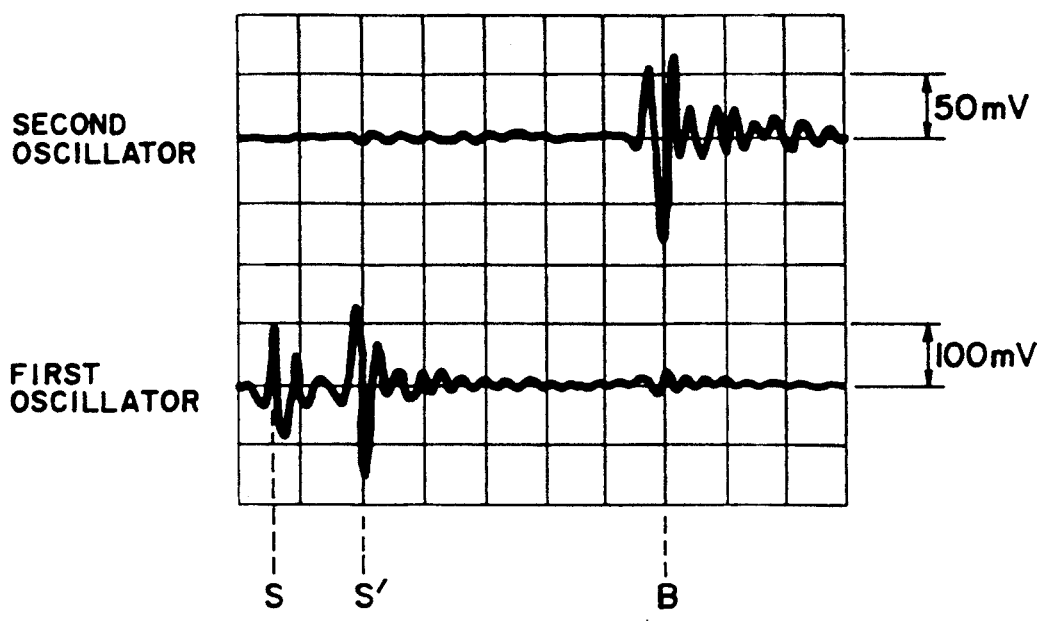
FIG. 7 is a view showing the waveforms of reception signals of first and second oscillators when an ultrasonic probe having wide band characteristics is used.
Figure 8:
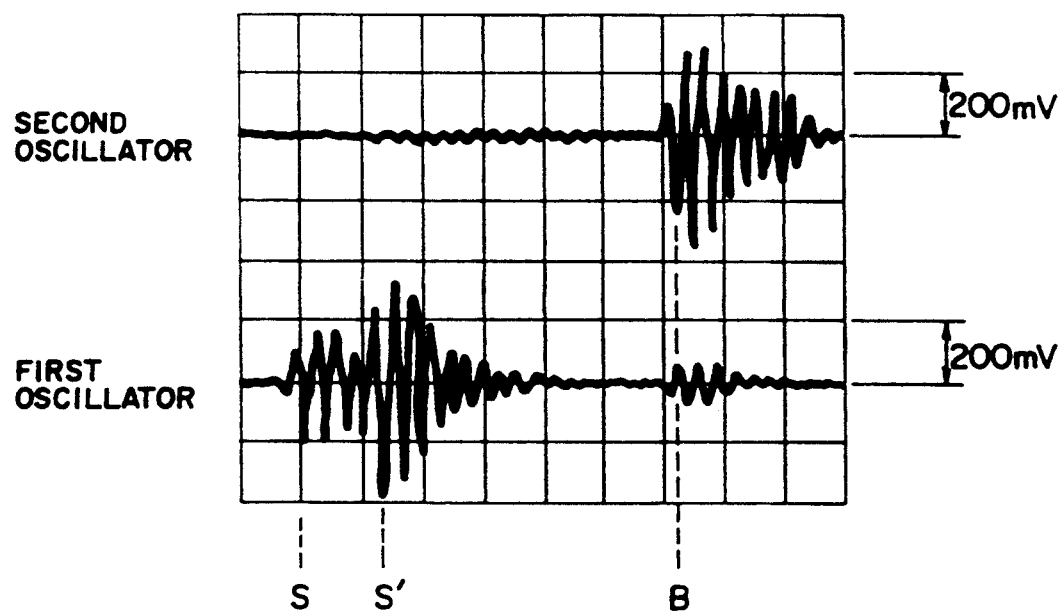
FIG. 8 is a view of the waveforms of the reception signals of the first and second oscillators when an ultrasonic probe having narrow band characteristics is used.

FIG. 7 is a view of waveforms displayed on an oscilloscope of a reception signal of the first oscillator 16 and a reception signal of the second oscillator 18 when a thickness is measured according to this invention with the ultrasonic probe having a wide band characteristic. Here, it can be said that the wide band ultrasonic probe having up to about 4 peaks in the reflected wave is a probe in which the band width of the frequency spectrum of the reflected wave is wide. FIG. 8 is a waveform diagram when a narrow band ultrasonic probe is used under the same conditions as those of FIG. 7. As understood by comparing FIGS. 7 and 8, the former has high resolution of the surface reflection wave and the boundary face reflection wave but the response output of the bottom reflection wave is of small voltage thereby requiring large amplification, in comparison to which the latter with the narrow band ultrasonic probe has poor resolution of the surface reflection wave and the boundary face reflection wave and large response output of the bottom reflection wave. Although this invention can be embodied using either ultrasonic probe, both have their merits and demerits as described above. In order to provide a preferable resolution of the boundary face reflection wave and the surface refection wave and to eliminate the need for large amplification of the bottom reflection wave, the ultrasonic probe 10 preferably will have the first oscillator 16 and a damper 86 of the back side with wide band characteristics, and the second oscillator 18 and a damper 88 of the back side with narrow band characteristics. Alternatively, both the first and second oscillator 16 and 18 may have narrow band characteristics because the attenuation of ultrasonic waves across the delay material, which is generally acrylic resin, and the plate to be measured is increased as the temperature increases.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. An instrument for measuring the thickness of a plate independent of any couplant and adherent coating on the plate between the instrument and the plate, said instrument comprising in combination a dual type ultrasonic probe including a first element for transmitting and receiving an ultrasonic pulse, and a second element aligned in mutual proximity to and spaced by an acoustic partition from said first element for receiving an ultrasonic pulse; ultrasonic pulse generating means coupled to said first element of said ultrasonic probe for causing said first element to transmit ultrasonic pulses; first signal output means connected to said first element of said ultrasonic probe for providing a first signal upon receipt by said first element of an interface reflection wave having an amplitude in excess of a predetermined set value; means coupled to said first signal output means for setting said predetermined value at a level to discriminate against interface reflection waves from all but the top surface of said plate; second signal output means connected to said second element of said ultrasonic probe for providing a second signal corresponding to a bottom reflection wave when said second element receives a bottom reflection wave from the bottom of said plate; signal processing means coupled responsively to said first and second signal output means for determining the difference in reception times between said interface reflection wave and said bottom reflection wave from said first and second signals and calculating therefrom the thickness of said plate; and display means coupled to an output of said signal processing means for displaying the thickness of said plate as calculated by said signal processing means.

2. An instrument for measuring the thickness of a plate according to claim 1, wherein said display means is a liquid crystal display.

3. An instrument for measuring the thickness of a plate according to claim 1, wherein said display means is a printer.

* * * * *

UNITED STATES PATENT AND TRADEMARK OFFICE
CERTIFICATE OF CORRECTION

PATENT NO. : 5,201,225
DATED : April 13, 1993
INVENTOR(S) : Takahashi et al

It is certified that error appears in the above-indentified patent and that said Letters Patent is hereby corrected as shown below:

Column 4, line 58, circle numeral "15" --(15)--; line 59 circle numeral "15" --(15)--; line 67, after "signal" insert --(2)--.

Column 5, lines 22-26 circle following numerals -- 11 --, --10--, -- 13 --, -- 12 --; lines 27-28, circle following numerals -- 13 --, -- 14 --; lines 30-34, circle following numerals -- 14 --, -- 15 --, -- 15--; line 45, "ca" should read --can--.

Signed and Sealed this

Twenty-sixth Day of April, 1994

BRUCE LEHMAN

*Attest:*

*Attesting Officer*    *Commissioner of Patents and Trademarks*